June 9, 1959 R. D. BAKER 2,890,110
PRODUCTION OF PLUTONIUM FROM PLUTONIUM FLUORIDE
Filed May 10, 1950
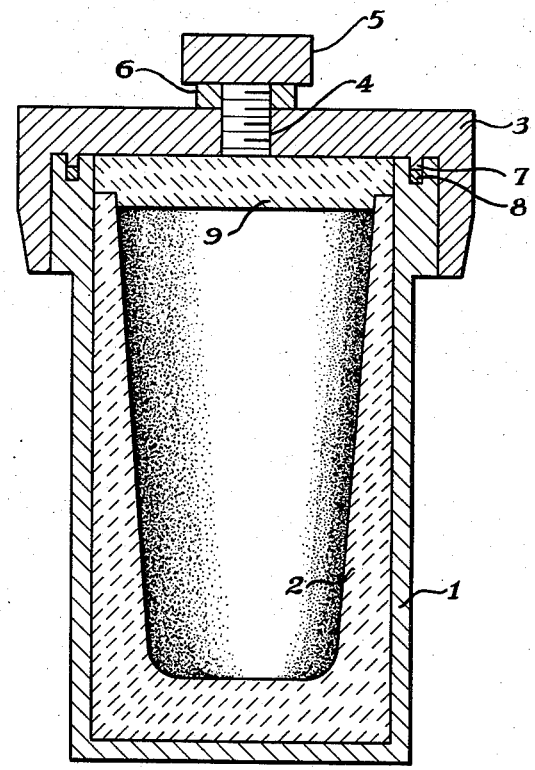
WITNESSES:
INVENTOR:
Richard D. Baker

United States Patent Office 2,890,110
Patented June 9, 1959

2,890,110

PRODUCTION OF PLUTONIUM FROM PLUTONIUM FLUORIDE

Richard D. Baker, Los Alamos, N. Mex., assignor to the United States of America as represented by the United States Atomic Energy Commission Application May 10, 1950, Serial No. 161,147

2 Claims. (Cl. 75—84.1)

This invention relates to the production of metallic plutonium and more particularly to the reduction of plutonium halides to plutonium metal.

It is desirable that a process be known for the reduction of compounds of plutonium to the elementary metal. The only prior art method known for the production of appreciable quantities of plutonium is the neutron irradiation of the uranium isotope of mass number 238, for example, in a neutronic reactor or pile. The plutonium thus formed must be separated from the unconverted uranium. As a result of the separation processes plutonium appears in the form of various compounds; for some applications the metal is required.

It is therefore an object of this invention to provide a method for producing plutonium metal from compounds of plutonium.

It is another object of this invention to provide a method for reducing plutonium halides to metallic plutonium.

It is a further object of this invention to provide a method for reducing plutonium halide to a dense, coherent, easily recovered mass of metallic plutonium of a high degree of purity.

These and other objects are accomplished according to this invention by heating a mixture of plutonium halide and an alkaline earth metal as a reducing agent together with a booster substance which is capable of reacting with the reducing agent to release heat. The finely divided reagents are thoroughly mixed, and charged into a closable vessel or bomb. After the air within the vessel has been replaced by an inert atmosphere, the vessel and contents are heated rapidly until reaction occurs. By appropriate choice of rate of heating and of the nature and amount of reagents, as is fully disclosed in the description which follows, the reaction products are liquefied as formed, and the molten plutonium separates from the less dense fluid slag. When the system has been cooled and opened, the plutonium is recovered as a dense coherent mass, covered by a protective layer of slag. The scale of operation must, of course, be less at all times than that which would provide a mass of fissionable material large enough to support a self-sustaining nuclear reaction.

Reference is made to copending applications of Baker, S.N. 161,148, filed May 10, 1950, now abandoned; Foster et al., S.N. 675,834, filed June 10, 1946, now U.S. Patent 2,834,672; and Spedding and Baker, S.N. 142,342, filed February 3, 1950, now abandoned.

The above applications relate to reduction processes for producing metals of the first and second rare earth series from their halides.

As plutonium halides, the fluoride, chloride, bromide or mixtures thereof, have been found suitable. Particularly suitable are plutonium fluoride made by the action of hydrogen fluoride on plutonium oxide, and plutonium chloride which has been sintered at 725° C. for a period of a few hours. For best results, substantially complete conversion of the starting material to the chloride is necessary, although once pure chloride has been formed, the absorption of small amounts of water does not have deleterious effects. Plutonium fluoride, on the contrary, usually gives satisfactory results providing the conversion of the oxide to fluoride has been carried to an extent of at least about 90 percent. It is preferred to use pure, water-free materials, although it is possible to use halides not completely free from such impurities as oxygen and water, for example, as stated above. It is also preferred that the bulk density of the materials be as high as convenient, in order to achieve maximum output from equipment.

As the reducing agent, calcium has been found to be convenient, although magnesium, strontium and barium may be used. In order both to remove oxide and to secure adequate contact among the reagents, the calcium may be broken up into small pieces, ground and screened. This process gives a clean shiny product which is preferably stored in an inert atmosphere. It is of course preferred that the reducing agent be pure and free from undesirable impurities which could not be readily removed from the plutonium produced.

The booster is an especially important feature of the process of this invention. The reaction of the booster with a portion of the metal reducing agent liberates heat at a rapid rate within the reaction mixture so that the reaction products are melted and the dense plutonium can separate from the less dense fluid slag to collect at the bottom of the container.

Another function of the booster is to provide, if desired, a material which will lower the melting point of one or more components of the reaction mixture. For example, if calcium is used to reduce plutonium fluoride the calcium fluoride slag which is formed has a very high melting point. The reaction between calcium and the plutonium fluoride takes place at a must lower temperature. It is not practical to heat the reaction mixture, in the very brief time available between the start of the reaction and the formation of an appreciable amount of slag, to a temperature sufficiently high so that the calcium fluoride slag will melt and allow the plutonium metal to collect into the desired coherent mass. However, if iodine, for example, is used as a booster, it not only serves to generate heat rapidly within the reaction mixture so as to carry the main reaction to completion within a very short time but also reduces the melting point of the slag formed, inasmuch as calcium iodide has a melting point lower than that of calcium fluoride.

General requirements for a suitable booster substance are that it react with the reducing metal to liberate heat, preferably in relatively large amount and at a reaction initiation temperature comparable to the initiation temperature of the main reaction; that it not attack the crucible, bomb, or the slug of reduced metal; that it not introduce undesirable impurities into the plutonium; that it not be unduly expensive or difficult to handle; and further, that, if desired, it serve to lower the melting point of the slag or of the metal, to facilitate collection of the metal. While it is, of course, possible to add a flux to the reaction mixture in order to increase the ease of separation of the reduced metal, it is preferred to employ a booster substance which serves also as a source of fluxing material.

If, in a given circumstance, the plutonium is the high-melting component of the reaction products, a booster substance such as the salt of a low-melting metal may be employed, which salt will react with the reducing metal to liberate heat and to form a metal which alloys with the plutonium to lower its melting point so that lower temperatures may be employed for successful operation of this process. The alloying element may subsequently be removed by distillation under high vacuum, or may be allowed to remain in the plutonium if some desirable result, such as the stabilizing of a high-temperature phase as disclosed in the copending application of Jette, Serial No. 30,907, filed June 3, 1948, the conferring of desirable nuclear properties, or the like, is achieved thereby. Indeed, plutonium alloy of desired characteristics may conveniently be prepared by reducing conjointly with the plutonium halide a halide of the alloying element or elements, quite apart from any contribution to the main reaction which might be made by the reaction of the alloying element halide with the alkaline earth metal reducing agent.

An inert atmosphere is preferably provided, to avoid the formation of high melting slag by the reaction of calcium with air to form refractory calcium oxide and calcium nitride, and to minimize the oxygen and nitrogen content of the plutonium produced. The term inert is here employed in its usual sense to mean "not significantly reactive toward any component of the system." An atmosphere of one or more such gases such as helium, neon and argon is suitable. A convenient method for replacing the air enclosed in the bomb is to evacuate the bomb through a hole provided in the lid, and then allow argon, for example, to flow into the bomb to restore atmospheric pressure. The process may be repeated if desired.

The apparatus which has been developed for carrying out the process of this invention is illustrated in the single figure of the drawing which is made a part of this specification. In the figure is shown the metal bomb 1, together with its refractory liner 2 and lid 3. In the lid is provided a small opening 4, with closure 5 and gasket 6 therefor. This opening is used for evacuating the air from the charged vessel and admitting the inert atmosphere. The lid is further provided with a projection 7, which contacts gasket 8 of the body of the bomb in sealing relation. Suitable means are provided for the mutual engagement of bomb lid and body, such as threads.

The refractory liner 2 is a crucible of low porosity, made from magnesium or calcium oxide, for example, by the usual steps of pressing powdered material in a mold or die, removing the crucible, and firing. A lid 9, made of similar material, is provided. The low porosity of the crucible is directed toward avoiding absorption therein of the liquid reaction products, with a consequent lowering of the yield. The liner may fit the bomb closely or may be somewhat smaller than the internal diameter of the containing vessel, in which case the annular space therebetween is filled with granular refractory material, such as that from which the crucible is made.

In view of the dependence of the process of this invention on heating, as discussed below, it is important that reproducible thermal contact be established between the crucible and the containing bomb. The packing of granular refractory material serves this purpose, and also serves to protect the crucible from mechanical and thermal shock and to increase ease of loading and unloading.

It is important to control the rate at which the bomb and its contents are heated. The temperature at which the reaction begins to produce plutonium and slag is below that at which either product melts, and unless the rate of heat input is sufficiently great so that the temperature is raised rapidly enough to melt the product before the reaction has produced any great quantity of metal and slag, satisfactory results cannot be obtained. If the heating of the system to reaction temperature is carried out in too short a time, however, the outer layers of the charge are raised to reaction temperature while the inner portion of the charge is still relatively cool. At this relatively low heat content of the system, satisfactory collection of the metal does not result. The heating of the reaction mixture to fluidity once it has solidified does not in general give satisfactory results.

A further problem in regard to heating is the possibility of a superficial reaction between the booster and the reducing agent. If a relatively long time is taken to reach the initiation temperature for vigorous reaction between the reducing agent and either the plutonium salt or the booster, the prolonged contact among the reagents at elevated temperature as the mixture slowly approaches the initiation temperature may lead to the formation of a coating of reaction product on the surface of the reducing agent. This coating may interfere with or prevent contact between the reducing agent and the booster or plutonium salt, and thus lead to an unsatisfactorily low rate or extent of reaction.

The following example, together with suitable modifications thereof, is given to illustrate the operation of the process of this invention.

*Example*

Plutonium fluoride is mixed with 0.3 mole of iodine per mole of plutonium and finely divided calcium metal in an amount 25 percent in excess of that required to reduce both the plutonium salt and the iodine. All manipulations of plutonium or its compounds are carried out in a drybox, for the protection of the operator. The mixture is charged into the magnesia liner of a steel bomb, and the bomb lid is placed in position and secured. The air within the bomb is replaced with argon. The bomb is placed in the coil of an induction heating device and heated thereby. The temperature of the bomb is followed by means of a thermocouple located, for example, in a well which is welded to the outside of the bomb. When this thermocouple has reached a temperature which corresponds to an internal temperature of the order of 300° C. as determined by independent experiments on rate of heating carried out with thermocouples placed outside and inside the empty bomb, a sharp upward break in the rate of temperature increase is noted, indicating that the reaction has begun. Heating is discontinued at this point, for the heat evolved by the reaction of these materials in the stated proportions has been found to be adequate for satisfactory completion of the process of this invention.

The bomb is cooled, and opened in the drybox. The liner is removed and broken away from the slug of metal, which is cleaned and dried. A long series of large scale runs employing the above proportions of reagents has given yields averaging 90.0 percent.

Plutonium salts which have proved satisfactory in a process as in the above example are the trifluoride, the tetrafluoride, the trichloride and the tribromide.

As the reducing agent, calcium is the most convenient, but magnesium, strontium and barium are suitable. A slight excess of reducing agent is preferably employed, in the range of from about 5 to about 30 percent.

Iodine is the most convenient booster; zinc chloride, ferric fluoride and potassium chlorate are typical variants. The general class of suitable materials includes low-melting reducible salts of metals other than alkali and alkaline earth metals and oxidizing salts such as potassium chloride, wherein the metal is appreciably more volatile than is plutonium in order that such metals may be removed by remelting the recovered slug under high vacuum and distilling out impurities or alloying elements from the plutonium. If the alloying element is not to be removed, then the volatility thereof is not important.

When iodine is used as a booster, the ratio of 0.3 mole of iodine per mole of plutonium salt is preferred. It is possible, however, to economize on this rather expensive material, and employ ratios as low as 0.2:1 or even lower. These lower ratios are suitable when the halide is of very high purity and when accurate control over reaction conditions is possible.

The preferred rate of heating in this process is somewhat dependent on specific conditions such as reagent particle size, the heat capacity of the bomb assembly and the rate of heating of the heating apparatus, especially in connection with changes in the scale of operations, and should be determined and established for any given set of conditions with the aid of the considerations set forth in this specification. Times of the order of a few minutes are usual.

A possible variation in the process as illustrated is to add plutonium turnings to the reaction mixture in order to reduce the metal therein to a unitary piece for rehandling.

While many embodiments of the invention are set forth in the foregoing specification it is to be understood that the invention is not to be limited except as indicated in the appended claims.

What is claimed is:

1. The process for producing plutonium metal in a unitary, coherent mass which comprises rapidly and uniformly heating to a temperature of about 300° C., a mixture of plutomium fluoride with iodine in a ratio of 0.15 to 0.3 mole of iodine to 1 of fluoride and calcium metal in an amount of about 25 percent in excess of that required to reduce the plutonium fluoride to plutonium metal and the iodine to calcium iodide.

2. The process of claim 1 in which the time of heating is from about 2 to 11 minutes.

References Cited in the file of this patent

UNITED STATES PATENTS

| | | |
|---|---|---|
| 1,106,384 | Hughes | Aug. 11, 1914 |
| 1,568,685 | Moore | Jan. 5, 1926 |
| 1,646,734 | Marden | Oct. 25, 1927 |
| 1,704,257 | Marden et al. | Mar. 15, 1929 |
| 1,728,940 | Marden | Sept. 24, 1929 |
| 2,785,065 | Spedding et al. | Mar. 12, 1957 |
| 2,834,672 | Foster et al. | May 13, 1958 |

OTHER REFERENCES

Seaborg: Chemical and Engineering News, Dec. 10, 1945, pages 2190–2193.